United States Patent [19]
Forin et al.

[11] Patent Number: 5,510,971
[45] Date of Patent: Apr. 23, 1996

[54] SAFETY CONTROL DEVICE AND PROCESS WITH ANALOG POWER OUTPUT

[75] Inventors: Philippe Forin, Montigny-Le-Bretonneux; Didier Minesi, Saint-Fargeau-Ponthierry, both of France

[73] Assignee: Matra Transport, Montrouge, France

[21] Appl. No.: 238,329

[22] Filed: May 5, 1994

[30] Foreign Application Priority Data

May 6, 1993 [FR] France ................................ 93 05450

[51] Int. Cl.$^6$ ........................................... H02M 7/44
[52] U.S. Cl. .............................. 363/56; 363/71; 363/58; 363/98
[58] Field of Search ........................ 363/71, 17, 95, 363/98; 371/14, 63, 55, 52, 57.1

[56] References Cited

U.S. PATENT DOCUMENTS

| | | | |
|---|---|---|---|
| 3,867,643 | 2/1975 | Baker et al. | 307/151 |
| 4,052,657 | 10/1977 | Kleiner et al. | 363/43 |
| 4,150,425 | 4/1979 | Nagano et al. | 363/56 |
| 4,695,933 | 9/1987 | Nguyen et al. | 363/17 |
| 4,853,832 | 8/1989 | Stuart | 363/17 |
| 4,873,606 | 10/1989 | Pannier | 361/152 |
| 4,956,762 | 9/1990 | Loveness et al. | 363/65 |

FOREIGN PATENT DOCUMENTS 296959 12/1988 European Pat. Off. .
346807 12/1989 European Pat. Off. .

*Primary Examiner*—Peter S. Wong
*Assistant Examiner*—Shawn Riley
*Attorney, Agent, or Firm*—Larson and Taylor

[57] ABSTRACT

The safety control device with digital input and analog output, is intended to deliver a mean output power above a specified threshold when two binary input sequences which are complementary or in phase opposition are applied to the input and an output power appreciably below the threshold in all other cases. It comprises a primary voltage source (18) supplying a cascade of several modules ($16_1, \ldots, 16_k$) each having an AC converter bridge and a rectifier, each branch of the AC converter bridge being controlled by one of the sequences.

7 Claims, 3 Drawing Sheets

SAFETY CONTROL DEVICE AND PROCESS WITH ANALOG POWER OUTPUT

BACKGROUND OF THE INVENTION

The invention relates to the safety control of actuators with analog input and it finds a particularly significant although not exclusive, application in the field of transport and in that of industries where the untimely entry of a member into a specified state can have serious consequences.

The device and the process are intended to be incorporated into systems using digital procedures to discharge the safety functions and in which there appears at least one control or enable code, the absence of which must assuredly give rise to the placement of the system in a safety state.

Frequently, the need is felt for a safety control device allowing an input code to be converted into an analog power signal, which must be present if the code is right and which must assuredly be absent if the code is erroneous or lacking.

A safety control device with digital input and analog power output has already been proposed, comprising an input logic circuit delivering a continuous analog signal for as long as a digital input code is right and an analog output amplifier, intended to carry the analog signal to the level necessary for the input interfaces of the actuators. The logic circuit is made up of an EXCLUSIVE OR operating under intrinsic safety and receiving, on its two inputs, continuous bit sequences which are in phase opposition for as long as no error has been detected upstream. When the sequences are in phase opposition the circuit provides a continuous analog signal. If phase opposition is lost, even in a single bit, the enable signal drops to the low state and the logic circuit is designed so as to remain in this state until re-energizing either automatically after a specified interlude or through an external reset signal.

The known device has drawbacks. The output amplifier must operate under intrinsic safety, that is to say be incapable of delivering power sufficient to operate an actuator for as long as the EXCLUSIVE OR circuit does not deliver an enable signal thereto. Moreover, the safety checking rate is relatively slow when the input code comprises several tens of bits, as is frequent. It may be that only the last bit is erroneous, thus delaying the transfer to the safety state. Also, production of the logic circuit with intrinsic safety necessitates limiting the clock frequency to around 500 bits per second.

SUMMARY OF THE INVENTION

The present invention aims in particular to provide a safety control device which copes better than the previously known ones with the demands of practice, in particular in that it allows high power to be delivered without having to resort to safety amplifiers placed downstream. The invention also aims to permit fast control sequence rates, by utilizing a particular makeup of the device.

The invention proposes in particular a safety control device, with digital input and analog output and intended to deliver a mean output power above a specified threshold when two binary input sequences which are complementary or in phase opposition are applied to the input and an output power below another threshold (typically more than five times lower than the previous one) in all other cases, characterized in that it comprises a primary DC voltage source supplying a cascade of several modules each having an AC converter bridge of a module and a rectifier, each branch of the AC converter bridge being controlled by one of the sequences.

The equipment delivering the digital input sequences (generally a digital controller) is generally designed to deliver per module, as correct code, two complementary digital input sequences made up of p bits and repeated regularly, and to decorrelate the two sequences fully in order to form an incorrect code.

In the absence of error, the two control sequences of a same AC converter are in phase opposition. Consequently the module delivers, on its output, the power presented to its input, to within its efficiency (in general above 90%). The module can however be designed so that the output voltage is equal to the input voltage. If, on the other hand, an error is detected, the sequences presented to the device by the digital checker become inconsistent. There is consequently one chance in two that each bit of the control sequence for a branch or half-bridge is in phase with the corresponding bit applied to the other half-bridge. Each AC converter therefore copies over to its output the voltage present on its input for only half the time on average and delivers a zero voltage for the other half of the time only. The rectification carried out by the rectifier causes the output power to be slightly below half the input power. If k modules receiving independent sequence pairs are cascaded and the first is supplied by a DC voltage source Ve, the mean output voltage Vs is equal to $2^{-k}\cdot Ve$ in the event of error. If the control sequences are absent, the output voltage vanishes.

As will be seen further on, it is possible to further reduce the mean output voltage in the event of error, by operating the breaker switches placed in the half-bridges via feedback loops.

The invention also aims to provide a safety control process capable of being implemented with the aid of a device of the kind described above. To this end, the invention proposes an analog actuator safety control process based on a digital enabling signal made up of two binary sequences which are complementary so as to represent a correct code and are inconsistent or decorrelated in other cases, according to which a DC electrical input power voltage is subjected to a cascade for transformation into an AC voltage and for rectification, each transformation being performed with the aid of a bridge, each of the branches of which includes two breaker switches controlled by the same sequence.

BRIEF DESCRIPTION OF THE DRAWINGS

The invention will be better understood on reading the description which follows of particular embodiments given by way of non-limiting examples. The description refers to the drawings which accompany it, in which.

DESCRIPTION OF PREFERRED EMBODIMENTS

Figure 1:
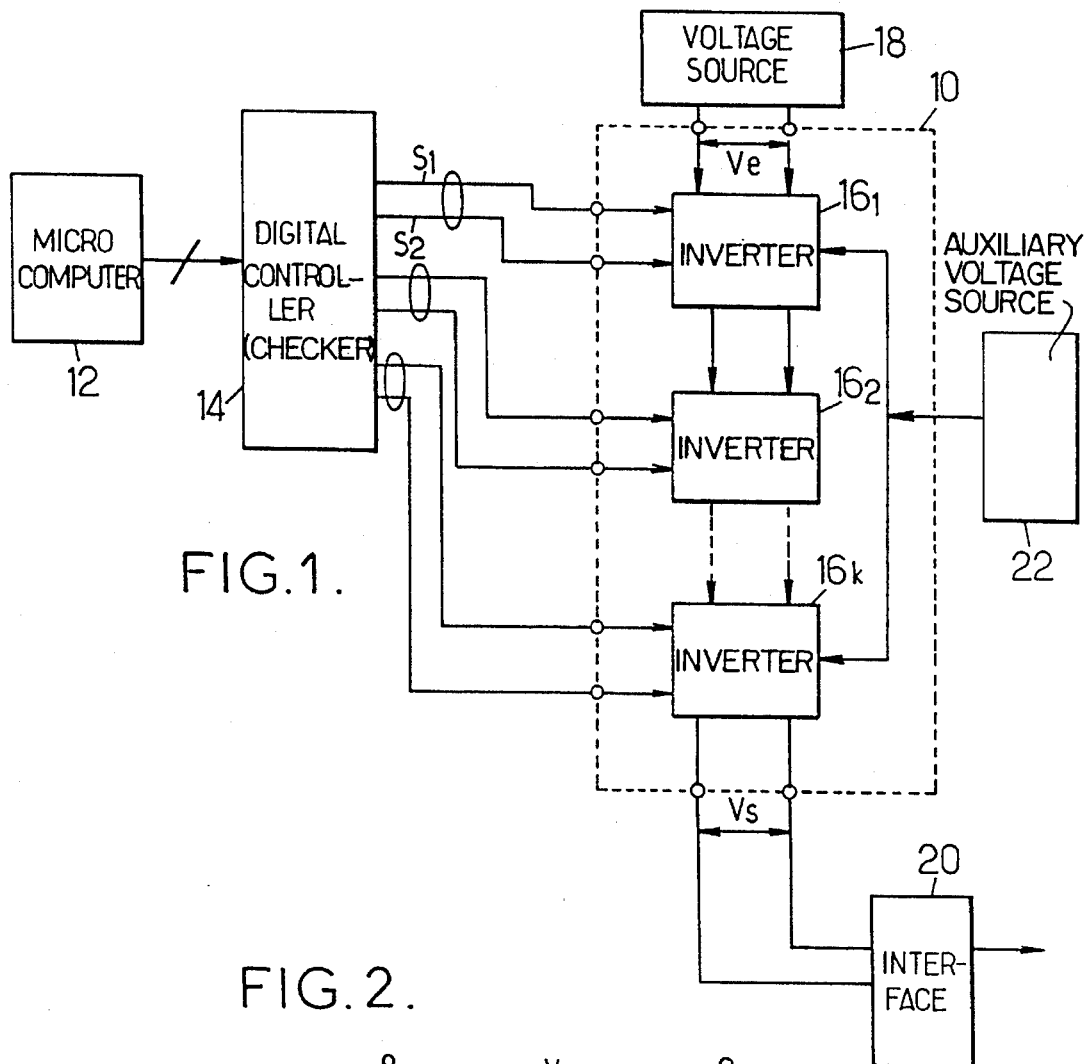
FIG. 1 is a basic diagram of a safety control device according to a first embodiment.

The control device 10 shown diagrammatically in FIG. 1 is designed to receive, from an item of upstream equipment, k input codes each made up of two binary sequences S1 and S2 which are applied in parallel and are complementary when the code is correct. These sequences are for example formulated by an upstream item of equipment, comprising a microcomputer 12 delivering a signature to be checked (p-bit sequence repeated several times per second) and a digital checker or controller 14, one possible makeup of which will be given further on. Each pair of sequences S1 and S2 differs from the others, at least in the event of error. In each pair, the sequences are complementary when the code is correct, and decorrelated when the code is erroneous.

The device 10 is made up of a cascade of identical modules $16_1$, $16_2$, ..., $16_k$. The first module $16_1$ receives a DC input voltage Ve originating from a primary voltage source 18 capable of delivering the power for supplying an actuator. Often the voltage Ve will be around 100 volts. The last module $16_k$ delivers an output voltage Vs to an actuator interface 20 or several thereof. An auxiliary voltage source 22 delivers the small power necessary for the operation of the modules.

Figure 2:
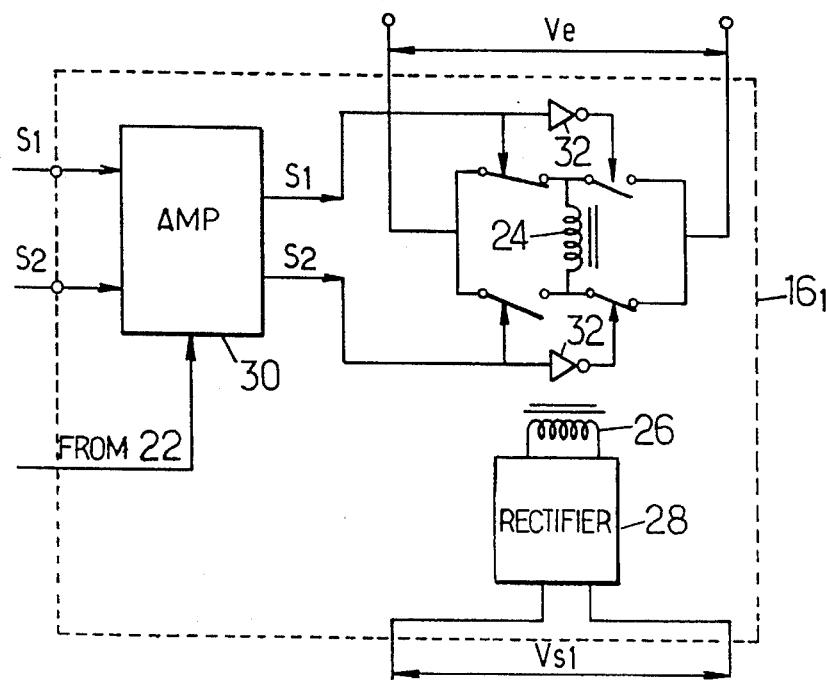
FIG. 2 is a schematic showing one possible makeup of one the modules of the device of FIG. 1.

Each of the modules $16_1$, ..., $16_k$ can have the basic makeup of the module $16_1$ shown in FIG. 2. It then comprises an AC converter bridge, each branch of which includes two breaker switches, which will generally MOS transistors. The diagonal of the bridge contains the primary 24 of a transformer whose secondary 26 drives a rectifier 28 delivering the output voltage from the module, $Vs_1$ for example. The breaker switches of the AC converter are controlled by a low-power amplifier 30, supplied from the auxiliary source 22; this amplifier carries the digital sequences S1 and S2 to the level necessary to operate the breaker switches and also performs a shaping. Each amplified sequence is applied directly to one of the breaker switches of a branch and, by way of a logic inverter 32 to the other breaker switch of the same branch.

In the absence of error ("permissive" state of the device), the two control sequences of a same AC converter are in phase opposition. The voltage $Vs_1$ is equal to the input voltage Ve and power is preserved, to within the efficiency. The same is true for the succeeding modules. The mean output voltage Vs is then equal to Ve. If on the other hand the sequences S1 and S2 are random ("restrictive" state), the output voltage Vs becomes equal to Ve multiplied by the factor $2^{-k}$. If the mean output voltage is reckoned to be divided by a factor 30 in the presence of error, five cascaded modules are sufficient. With 93% individual efficiency, 70% of the input power is still available at output when the sequences are in phase opposition. In some cases, filtering may be useful.

Figure 3:
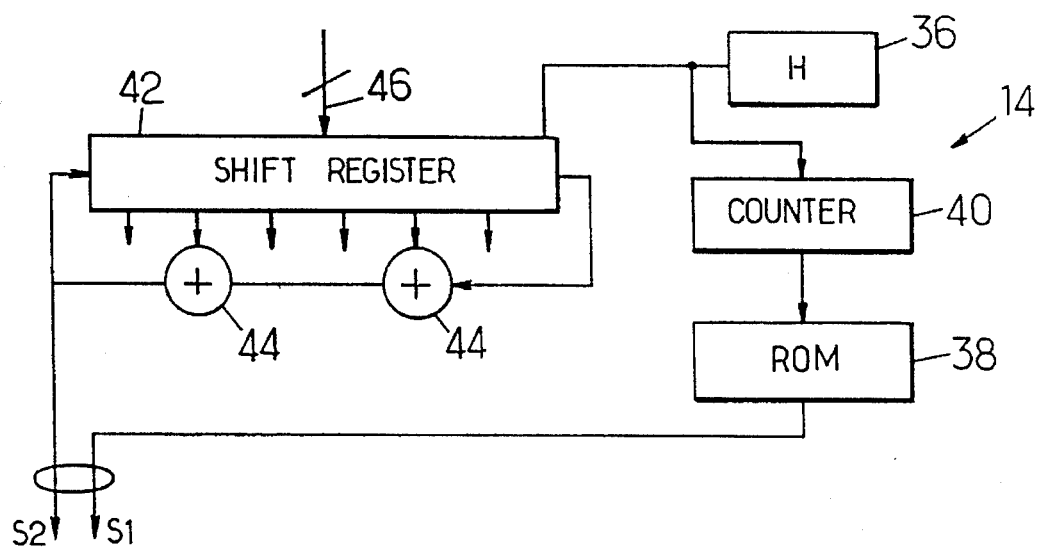
FIG. 3 is a schematic showing one possible makeup of a checker delivering control sequences to the device.

The checker 14 may have any of numerous well-known makeups. FIG. 3 shows a particular non-exclusive embodiment. The sequence S1 is stored in a read-only memory 38. It is delivered, at the rate of a local clock 36, by applying to the address input of the memory 38, the contents of a counter 40 incremented by the clock.

The sequence S2 is delivered by a pseudo-random generator made up of a shift register 42 looped back by way of a cascade of EXCLUSIVE OR gates 44. The register 42 is designed to be loaded in parallel by the microcomputer 12 and the rate of advance to the register is fixed by the clock 36. The content of the read,only memory 38 is determined on the basis of the signature applied to the parallel input 46 of the register and of the chain of adders in such a way that the sequences S1 and S2 are complementary when the signature is correct. If, on the other hand, the signature, made up for example by a 32-bit sequence, includes at least one incorrect bit, the sequence S2 loses all consistency with the sequence S1 and does so almost instantaneously.

The low-power amplifier may itself have any of the well-known makeups.

In the embodiment shown in FIG. 2, the rate of the control sequences is limited by the switchover time of the breaker switches. In certain cases it is necessary to circumvent this limitation, so as to reduce the width of the voltage pulses present on the output of each module. To this end, each of the control sequences S1 and S2 can be generated by undertaking the EXCLUSIVE OR or XOR operation on two primary sequences, having a faster rate, possibly attaining 1 Mbit per second instead of 50 kbit per second. Such a layout will be described further on whilst making reference to FIG. 5 where the primary sequences are denoted S11 and S12 in respect of S1, and S21 and S22 in respect of S2.

Figure 4:
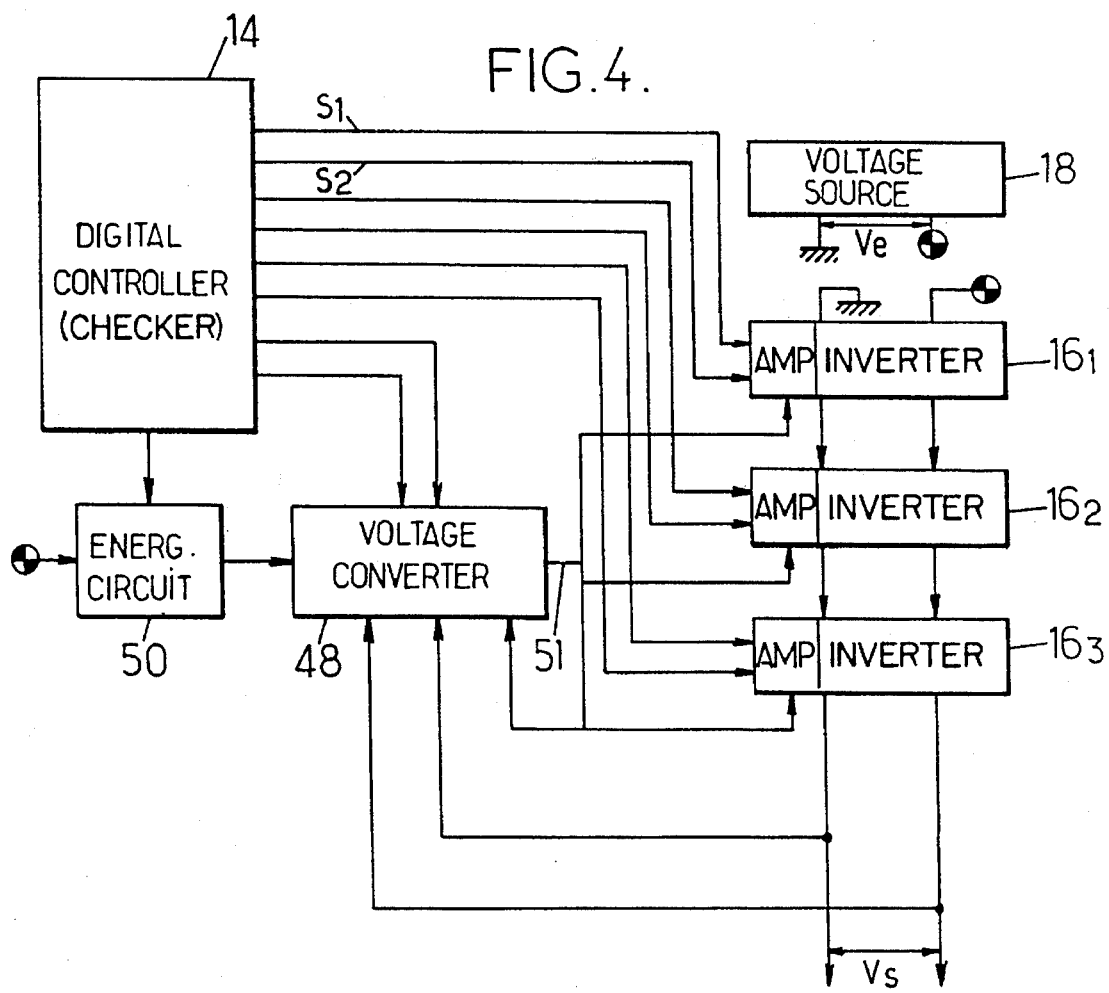
FIG. 4, similar to FIG. 1, shows a variant embodiment allowing the number of modules in the cascade to be reduced.

The embodiment shown in FIG. 2 necessitates the provision of a large number of stages to obtain a significant reduction in power in restrictive mode, since the attenuation of each stage is only 50%. To reduce the number of stages and hence simplify the system and improve its energy efficiency in normal or permissive mode, it is possible to use a looped layout giving rise to a self-latching phenomenon. FIG. 4, in which the elements corresponding to those of FIG. 2 bear the same reference numeral, shows such a device. It includes three modules $16_1$, $16_2$ and $16_3$ only (this number not being limiting) which would normally give merely a reduction ratio of 8. However the power necessary to place the breaker switches of the AC converters of these modules into the conducting state is no longer delivered by an auxiliary source delivering a fixed voltage, but by an auxiliary voltage converter 48 which can have a general makeup similar to that of the modules 16, also receiving the sequences S1 and S2. For the device to be able to start, it comprises an energizer circuit 50 receiving a control pulse from the checker 14 and delivering a start pulse to the auxiliary converter 48. The auxiliary converter is moreover self-supplied from its output 51 which delivers the energy necessary to cause the breaker switches of the modules to transfer to the conducting state, under the action of complementary sequences S1 and S2. In general it is sufficient for the auxiliary converter 48 to be able to deliver a few watts.

It has been observed that three stages are sufficient to obtain a reduction in the output voltage with a ratio of the order of 300 when the breaker switches are made up by MOS transistors having non-negligible consumption. The fall in the transistor control voltage brought about by the reduction in Vs when the sequences are decorrelated in turn delays each transfer of the transistors to the conducting state, which further causes the voltage Vs to fall.

Whatever embodiment is adopted, the device makes it possible to deliver high power, sufficient to actuate actuators without the interposition of analog safety amplifiers. Additionally, it allows for significant variations in its output load without impairing safety.

Figure 5:
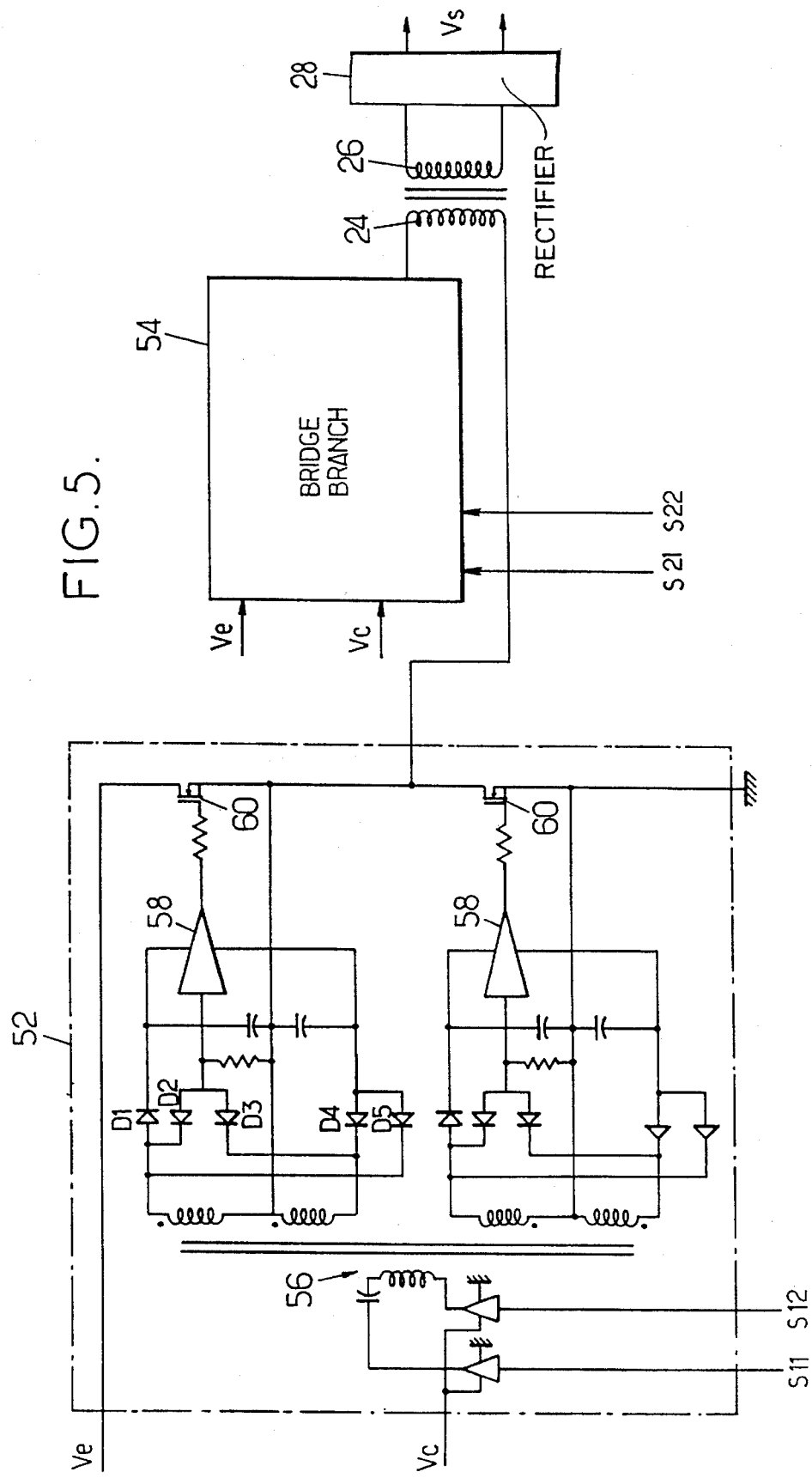
FIG. 5 is an electrical diagram showing one possible makeup of a stage usable in the device of FIG. 1.

The modules will be made up from different components depending on the application envisaged. FIG. 5 shows one possible makeup, using MOS switchover transistors as breaker switches. Just one of the branches 52 and 54 of the bridge is represented in full.

The power for setting the breaker switches into the conducting state is delivered by an amplifier which is supplied under a voltage Vc either from an auxiliary source (the case of FIG. 2), or from an auxiliary converter (the case of FIG. 4). The amplifier drives, by way of a transformer 56, a circuit which, such as it is represented, undertakes the EXCLUSIVE OR of primary sequences and shapes the resulting sequences S1 and S2.

The circuit can be made up by two buffer amplifiers associated with diodes which have several functions. In the branch represented at the top of FIG. 5, the diodes D2 and D3 discharge the EXCLUSIVE OR function; diode D1 delivers the positive voltage for supplying the amplifier 58; D4 and D5 deliver the negative supply with respect to the earthed mid-point. The amplifiers drive the breaker switches, made up by the respective MOS power transistors 60, the emitters of which are earthed.

The output primary 24 to the rectifier circuit is mounted between the mid-points of the two branches.

Because the device of FIG. 5 undertakes an EXCLUSIVE OR between the primary input sequences S11 and S12 on the one hand, and S21 and S22 on the other hand, it allows control on the basis of sequences with very fast rate, possibly reaching 1 Mbits per second. To operate the device in accordance with the basic diagram shown in FIGS. 1 and 2, it suffices to earth one of the inputs S11 and S12 (as well as one of the inputs S21 and S22) and to apply the sequences S1 and S2 with reduced rate to the remaining inputs.

We claim:

1. Fail safe control device having a digital input and an analog power output, for delivering a mean output electrical power which is above a first predetermined threshold when two binary input sequences which are complementary, in mutual phase opposition, are applied to the digital input and a mean output power which is below a second predetermined threshold, lower than the first threshold in all other cases, comprising:

one primary DC voltage power source, and a cascaded arrangement of a plurality of modules each having, in succession, AC converter bridge means and rectifier means, an input of said cascaded arrangement being connected to said primary power source for energization by said primary power source and each said AC converter bridge means having two branches each individually controlled by one of said binary input sequences.

2. Device according to claim 1, further comprising a digital controller arranged to repeat said two sequences regularly and to mutually decorrelate said two sequences in the event of a failure before applying them to said arrangement.

3. Device according to claim 2, wherein said sequences each consist of a predetermined number of bits.

4. Device according to claim 3, wherein one of said sequences is stored and wherein said digital controller is arranged to generate the other sequence from a signature, any deviation of the signature from a specified value resulting in said decorrelation.

5. Device according to claim 2, wherein said digital controller generates each of said binary input sequences by carrying an XOR operation on two primary sequences distinct from the binary input sequences and having a bit frequency which is higher than a bit frequency of said binary input sequences.

6. Device according to claim 1, wherein the AC converter bridge means of each of said modules includes a plurality of switches each having a conducting state and a non-conducting state, a placement of each of said switches in a conducting state resulting in electrical energy consumption and wherein said device further comprises an auxiliary converter receiving energy from the output of said device and supplying said switches with energy.

7. A method for fail safe control of a digital actuator responsive to an enabling digital signal consisting of two binary sequences which represent a correct code when mutually complementary and are uncorrelated in any other case, comprising subjecting an output of a DC power voltage to a cascade of steps each having a transformation into an AC voltage and a rectification, each transformation being performed with an electrical bridge circuit having two branches, each of the branches including two switches, and controlling the two switches in each one of the branches by one same sequence among said two sequences which is applied directly to one of the switches and is inverted before being applied to the other switch.

* * * * *